US009200804B2

(12) United States Patent
Park et al.

(10) Patent No.: US 9,200,804 B2
(45) Date of Patent: Dec. 1, 2015

(54) DEVICE FOR ELIMINATING HARMFUL SUBSTANCE

(75) Inventors: Han Oh Park, Daejeon (KR); Young-Mi Koo, Gunsan-si (KR); Jae Ha Kim, Daejeon (KR); Yang Won Lee, Daejeon (KR)

(73) Assignee: BIONEER CORPORATION (KR)

(*) Notice: Subject to any disclaimer, the term of this patent is extended or adjusted under 35 U.S.C. 154(b) by 312 days.

(21) Appl. No.: 13/989,512

(22) PCT Filed: Nov. 24, 2011

(86) PCT No.: PCT/KR2011/009022
§ 371 (c)(1),
(2), (4) Date: Jun. 4, 2013

(87) PCT Pub. No.: WO2012/070886
PCT Pub. Date: May 31, 2012

(65) Prior Publication Data
US 2014/0060400 A1    Mar. 6, 2014

(30) Foreign Application Priority Data
Nov. 26, 2010 (KR) .................. 10-2010-0118612

(51) Int. Cl.
*F23G 5/40*     (2006.01)
*B01D 53/02*    (2006.01)
*B01D 53/86*    (2006.01)

(52) U.S. Cl.
CPC ........ *F23G 5/40* (2013.01); *B01D 53/02* (2013.01); *B01D 53/8687* (2013.01);
(Continued)

(58) Field of Classification Search
CPC .......... B01D 53/02; B01D 2255/1021; B01D 2255/1023; B01D 2255/104; B01D 2255/106; B01D 2255/20707; B01D 2255/20761; B01D 2255/2092; B01D 2255/702; B01D 2255/9202; B01D 2255/9207; B01D 2257/708; B01D 2259/40084; B01D 2259/4541; B01D 53/8687; F23G 5/40
See application file for complete search history.

(56) References Cited

U.S. PATENT DOCUMENTS 6,749,826 B2 * 6/2004 Tillotson et al. ........... 423/447.2
7,074,260 B2   7/2006 Lee et al.
(Continued)

FOREIGN PATENT DOCUMENTS

CN    101513612    8/2009
CN    101530716    9/2009
(Continued)

OTHER PUBLICATIONS

European Search Report—European Application No. 11842969.5 issued on Sep. 1, 2014, citing US 2005/135982, US 2006/133975 and US 2004/097371.
(Continued)

*Primary Examiner* — Timothy Vanoy
(74) *Attorney, Agent, or Firm* — Cantor Colburn LLP

(57) ABSTRACT

A device for effectively removing organic compounds from air by a carbon nanotube-catalyst composite having the two functions of an adsorption/catalytic incineration agent is provided. The carbon nanotube-catalyst composite simultaneously adsorbs the organic compounds and completely decomposes them by a catalytic reaction, and the optimal reaction active temperature by catalytic incineration is low. The carbon nanotube-catalyst composite has a large surface area and has high adsorption performance and catalytic decomposition activity, and is thus applicable to filters that use the methods of adsorption and/or catalytic incineration. The device for removing organic compounds from air includes an adsorption/catalytic incineration reactor including the carbon nanotube-catalyst composite to remove organic compounds from air.

21 Claims, 7 Drawing Sheets

(52) U.S. Cl.
CPC .... *B01D 2255/104* (2013.01); *B01D 2255/106* (2013.01); *B01D 2255/1021* (2013.01); *B01D 2255/1023* (2013.01); *B01D 2255/2092* (2013.01); *B01D 2255/20707* (2013.01); *B01D 2255/20761* (2013.01); *B01D 2255/702* (2013.01); *B01D 2255/9202* (2013.01); *B01D 2255/9207* (2013.01); *B01D 2257/708* (2013.01); *B01D 2259/40084* (2013.01); *B01D 2259/4541* (2013.01)

(56) References Cited

U.S. PATENT DOCUMENTS

| | | | |
|---|---|---|---|
| 7,258,795 | B1 | 8/2007 | Nemeth et al. |
| 7,922,796 | B2 * | 4/2011 | Holmes et al. .................. 96/108 |
| 7,927,567 | B2 * | 4/2011 | Yamanaka et al. ............ 423/210 |
| 2002/0192142 | A1 * | 12/2002 | Tillotson et al. ........... 423/447.1 |
| 2004/0097371 | A1 | 5/2004 | Jangbarwala |
| 2005/0135982 | A1 | 6/2005 | Pavlovsky |
| 2006/0133975 | A1 | 6/2006 | Yamanaka et al. |
| 2010/0116666 | A1 * | 5/2010 | Park et al. ...................... 204/571 |
| 2013/0034464 | A1 * | 2/2013 | Taylor ............................... 422/3 |

FOREIGN PATENT DOCUMENTS

| | | | | |
|---|---|---|---|---|
| KR | 20040056132 A | * | 6/2004 | ............ B01D 39/20 |
| KR | 100489471 | | 5/2005 | |
| KR | 1020050086038 | | 8/2005 | |

OTHER PUBLICATIONS

Kuniko Urashima et al., Removal of Volatile Organic Compounds from Air Streams and Industrial Flue Gases by None-Thermal Plasma Technology, IEEE Transactions on Dielectrics and Electrical Insulation, 2000, pp. 602-614.

International Search Report—PCT/KR2011/009022 dated Jul. 18, 2012.

* cited by examiner

After 10 hr

DEVICE FOR ELIMINATING HARMFUL SUBSTANCE

TECHNICAL FIELD

The present invention relates to a device for removing organic compounds from air, which is suitable for use in adsorption/catalytic incineration of the organic compounds found in air, and more particularly, to a device for removing organic compounds from air, comprising an adsorption/catalytic incineration agent composed of a carbon nanotube-catalyst composite in which catalyst particles having a size of ones of nanometer are uniformly bound to carbon nanotubes, a heating unit for heating the adsorption/catalytic incineration agent, and an air flow control unit for controlling the flow of air to pass the heated adsorption/catalytic incineration agent.

BACKGROUND ART

When air pollutants are emitted to the atmosphere, they diffuse and move with the air current which makes it difficult to treat them, and the cost of treating them may considerably vary depending on the type of treatment method. Among such air pollutants, because volatile organic compounds (VOCs) are not completely removed using typical air purifiers, it is important that the type of pollutant be exactly checked and that the method adapted to remove them be selected.

Techniques for removing VOCs as above use the methods of adsorption, absorption, condensation, membrane separation and so on to recover the generated VOCs. Among these, the adsorption method for recovering VOCs using an adsorbent such as activated carbon or zeolite is widely utilized because activated carbon has a large surface area and so results in high adsorption capability, but is disadvantageous because the activated carbon is ignitable and it is difficult to regenerate and the humidity should also be adjusted (<50% RH) before processing. For this reason, hydrophobic zeolite having a large surface area, thermal stability and no need to control the humidity is employed as an effective adsorbent. This method has a low installation cost and thus is mainly applied to filters but the maintenance cost is high because of the short lifetime and frequent replacement cycles. In addition, techniques for removing organic compounds from air may include thermal incineration, catalytic incineration, UV-oxidation, biofiltration, etc. The thermal incineration method is used to directly incinerate organic compounds present in air at high temperature (700~1100° C.) so as to remove them, and thus may treat a large amount of organic compounds in air. However, in the case where the load variation is severe or the concentration is low and the flow rate is low, the economic benefits may be negated. Also, in the case where poorly decomposable VOCs are present in exhaust gas, the combustion temperature may increase and thus relatively high operating cost is required, and furthermore the reaction temperature is high and thus there is a concern for generating secondary air pollutants such as NOx (Thermal NOx) via the oxidation of nitrogen in air upon high-temperature combustion. Moreover, because the system is comparatively large, a large mounting space is required, making it difficult to add equipment. Also, the catalytic oxidation method of removing VOCs is regarded as a very effective technique for converting harmful air pollutants into harmless materials, as is the thermal incineration method, and thorough research and development into ideal catalyst systems is ongoing. Such methods are advantageous because secondary pollutants such as nitrogen compounds are not generated, and the application places thereof have been recently increasing and thus thorough research and development into ideal catalyst systems is also ongoing.

In accordance with the catalytic incineration method, organic compounds present in air generated from a stationary source are combusted and removed using a catalyst. Compared to the high-temperature combustion method, harmful air pollutants may be effectively removed at a much lower reaction temperature, and furthermore, because the reaction temperature is low, the operating cost is profitably low, and almost no NOx is generated, and also the system is simple, making it easy to add equipment.

As an example of a system for removing organic compounds from air using adsorption/catalytic oxidation, U.S. Pat. No. 7,074,260 discloses a filter using carbon nanotubes.

This patent pertains to a filter comprising carbon nanotubes having one or more kinds of metal nanoparticles fixed thereto, wherein the fixing of the metal nanoparticles to the carbon nanotubes may be performed by holing pure graphite bars using an electric discharge process or a laser vapor-deposition process, filling the holes of the graphite bars with metal powder and then carrying out synthesis, or by using metal-mixed graphite as a target, thus obtaining functional carbon nanotubes having metal particles fixed thereto. However, this patent is problematic because it is difficult to constantly adjust the size of the metal particles and uniformly disperse the metal particles.

In addition, as an example of a system for removing organic compounds from air using adsorption/catalytic incineration, Korean Patent Publication No. 10-2004-0012364 discloses a VOC removal system using adsorption/catalytic oxidation to treat VOCs present in low concentration.

More specifically, Korean Patent Publication No. 10-2004-0012364 proposed a VOC removal system wherein the hydrophobic zeolite adsorbent and the VOC oxidation catalyst are embodied in a single system and thus the VOCs are concentrated on the hydrophobic zeolite adsorbent layer, heated and desorbed, thereby decomposing the desorbed VOCs in the oxidation catalyst layer to remove them. However, this VOC removal system requires additional two heating units for heating not only the adsorbent layer to desorb the adsorbed VOCs from the hydrophobic zeolite adsorbent layer but also the catalyst layer to decompose the desorbed VOCs using the oxidation catalyst.

In particular, because the combination of an adsorption method and a catalytic incineration method, which adsorbs the organic compounds in air and incinerates them using a catalyst, has the advantages of both the adsorption method and the catalytic incineration method, there is a need to develop an efficient adsorption/catalytic system and a device for removing organic compounds from air using the same.

DISCLOSURE

Technical Problem

Therefore, the present invention has been made keeping in mind the problems occurring in the related art and an object of the present invention is to provide a device for removing organic compounds from air, in particular, VOCs, using adsorption/catalytic incineration, which comprises an adsorption/catalytic incineration reactor including an adsorption/catalytic incineration agent composed of a carbon nanotube-catalyst composite wherein catalyst particles having a size of ones of nm are uniformly bound to carbon nanotubes.

Technical Solution

Provided is a device for removing organic compounds from air, which comprises an adsorption/catalytic incineration reactor having an air inlet and an air outlet and filled with an adsorption/catalytic incineration agent composed of a carbon nanotube-catalyst composite in which a metal or metal oxide catalyst is bound to part or all of the surface of carbon nanotubes; and a heating unit for heating the adsorption/catalytic incineration reactor.

The carbon nanotubes may be single- or multi-walled carbon nanotubes, and part or all of the air inlet and the air outlet may be provided with a fine porous material having a plurality of small holes having a diameter smaller than the size of the carbon nanotube-catalyst composite. Also, this device may further comprise a temperature sensor for measuring the temperature of the adsorption/catalytic incineration reactor and an automatic temperature controller that receives the temperature from the temperature sensor to controllably apply power to the heating unit, and may be linked to a gas analyzing system for analyzing the concentration of VOCs in air discharged from the air outlet. Furthermore, an air suction pump for introducing air to the gas analyzing system, and an air flow control valve for controlling the air flow rate of the air inlet may be provided before or after the gas analyzing system.

The size of the carbon nanotube-catalyst composite may be 1~500 nm, and the amount of the catalyst may be 1~70 wt % based on the total weight of the carbon nanotube-catalyst composite. The adsorption/catalytic incineration reactor may further comprise activated carbon which is provided in the form of a mixture with the carbon nanotube-catalyst composite, in addition to the carbon nanotube-catalyst composite.

As the catalyst of the carbon nanotube-catalyst composite, copper (Cu), platinum (Pt), nickel (Ni), etc. to remove VOCs from air; silver (Ag), aluminum (Al), copper (Cu), palladium (Pd), etc. to perform sterilization; titanium dioxide ($TiO_2$), gold (Au), etc. to remove odors, or metal compounds may be provided to further perform additional functions.

The catalyst may be contained in an amount of 0.1~70 wt % based on the total weight of the carbon nanotube-catalyst composite, and may have a diameter of 1~20 nm.

The adsorption/catalytic incineration reactor may be maintained at a temperature of 100~250° C. by means of the heating unit, and the fine porous material may include a pair of bundles of glass wool positioned respectively at both ends of the carbon nanotube-catalyst composite and a pair of stainless steel meshes disposed respectively on both outer sides of the pair o bundles of glass wool.

The heating unit may be made of a nickel-chromium (Ni—Cr) wire, and may have a hot wire around the adsorption/catalytic incineration reactor including the carbon nanotube-catalyst composite. The heating unit may include a carbonaceous planar heat-generating element, and may have a heat-generating surface around the adsorption/catalytic incineration reactor.

According to an embodiment of the present invention, the device for removing organic compounds from air may further comprise an isothermal unit for preventing the VOCs from being condensed in a plurality of pipelines and pipeline conversion switching valves. As such, the isothermal unit may include an isothermal block and an isothermal tube.

Advantageous Effects

According to the present invention, a device for removing organic compounds from air, including an adsorption/catalytic incineration reactor having an adsorption/catalytic incineration agent composed of a carbon nanotube-catalyst composite, is simple and stable and can be economically operated, and can also be utilized in processes conducted to remove VOCs to improve the work environments of places where volatile organic solvents are used such as the semiconductor, coating, printing, textile industries and so on, which are in need of decreasing their equipment cost. This device can be used alone in a conventional air purifier or in combination with a deodorization/adsorption filter of an air purifier, and furthermore, can be employed thanks to the superior performance of removing military chemicals, in lieu of impregnated activated carbon which is currently used, thus attaining replacement effects of military goods and elements for chemical, biological and radiological warfare to highly remove poisonous gases.

DESCRIPTION OF DRAWINGS

The above and other objects, features and advantages of the present invention will become apparent from the following description of preferred embodiments given in conjunction with the accompanying drawings, in which:

FIGS. 2A and 2B schematically show a device for removing organic compounds from air of Example 2 according to the present invention, wherein FIG. 2A shows the state of the organic compounds that are present in the air that is fed in being removed via adsorption/catalytic incineration by means of an adsorption/catalytic incineration reactor, and FIG. 2B shows the state of the removal of the organic compounds from air being monitored;

DETAILED DESCRIPTION OF MAIN ELEMENTS

Figure 1:
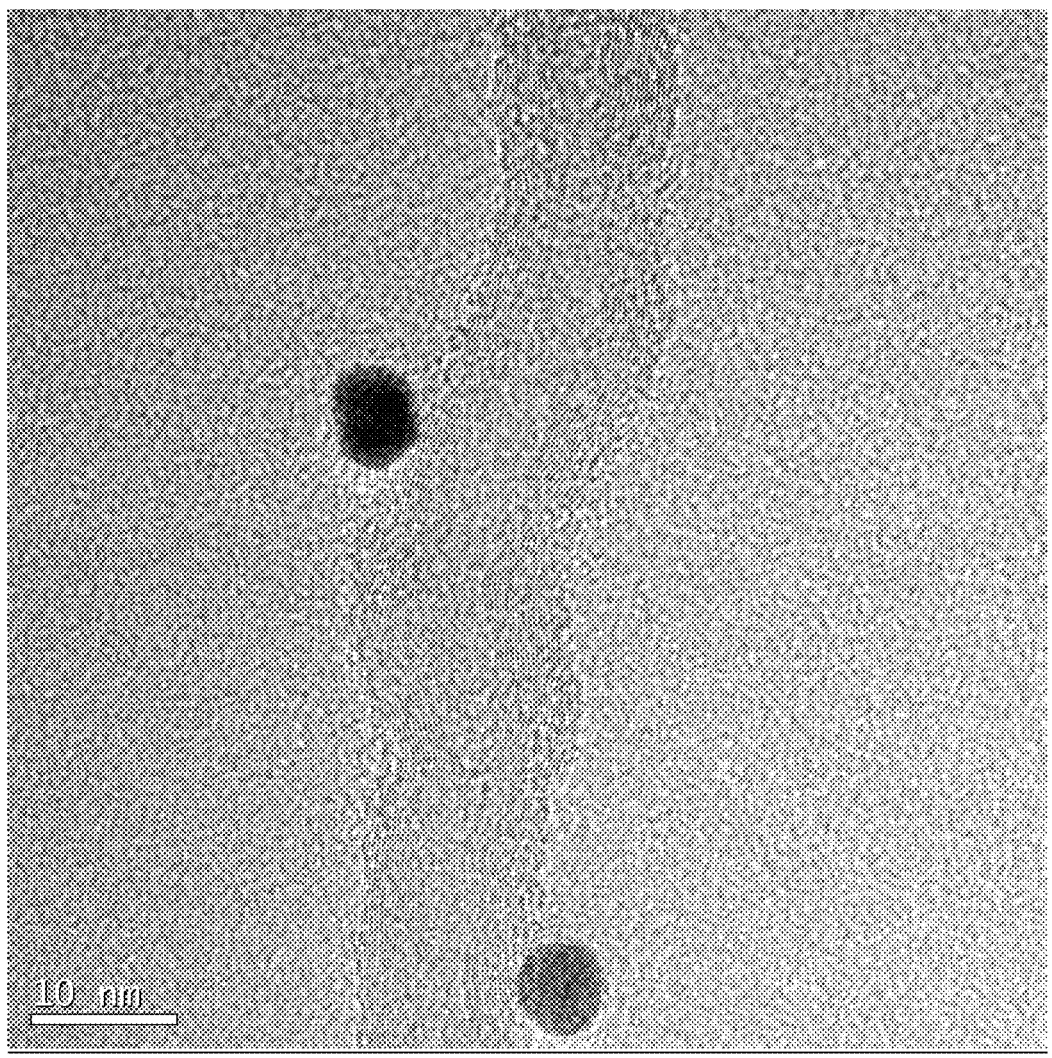
FIG. 1 shows a transmission electron microscope (TEM) image of a carbon nanotube-catalyst composite of Example 1 according to the present invention.

10: adsorption/catalytic incineration reactor for removing organic compounds from air
11: carbon nanotube-catalyst composite
12: heating unit
13: glass tube
14: temperature sensor 15: fine porous material
20: air flow control valve
30: 2-way valve
40: 2-way valve
50: air outlet
60: air inlet
70: air feeder
80: suction pump
90: gas analyzing system
91: loop
92: pipeline conversion switching valve
93: gas analyzer
94: dry gas supply source
100: 3-way valve (common port)
110: 3-way valve (outlet)

Mode for Invention

Hereinafter, a detailed description will be given of a device for removing organic compounds from air according to embodiments of the present invention with reference to the appended drawings. Throughout the drawings, the same reference numerals are used to refer to the same or similar elements. Furthermore, descriptions of known techniques, even if they are pertinent to the present invention, are regarded as unnecessary and may be omitted when they would otherwise make the characteristics of the invention and the description unclear. For the sake of the description, the drawings are depicted in the form of being magnified or reduced or simplified, and the drawings and their elements are not necessarily depicted in an appropriate ratio, which will be easily understood by those skilled in the art.

FIG. 1 shows a TEM image of a carbon nanotube-catalyst composite of Example 1, which is included in a device for removing organic compounds from air according to an embodiment of the present invention.

Figure 2A:
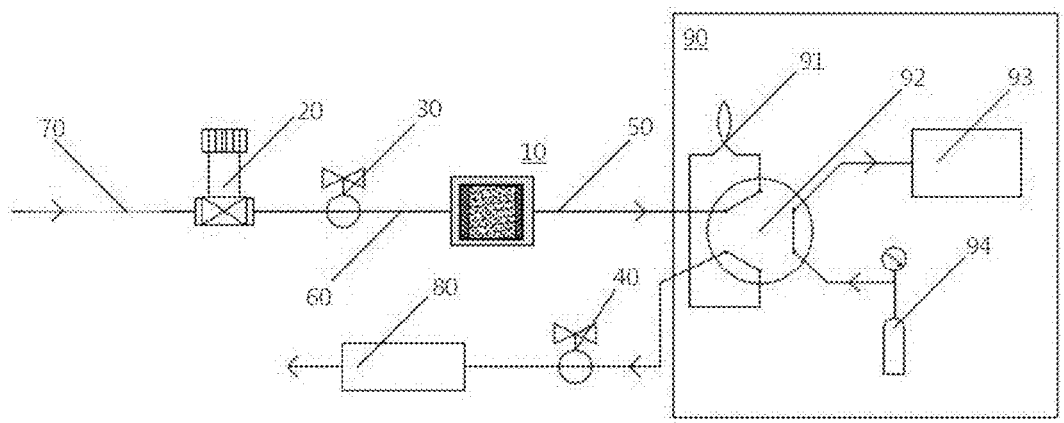
Figure 2B:
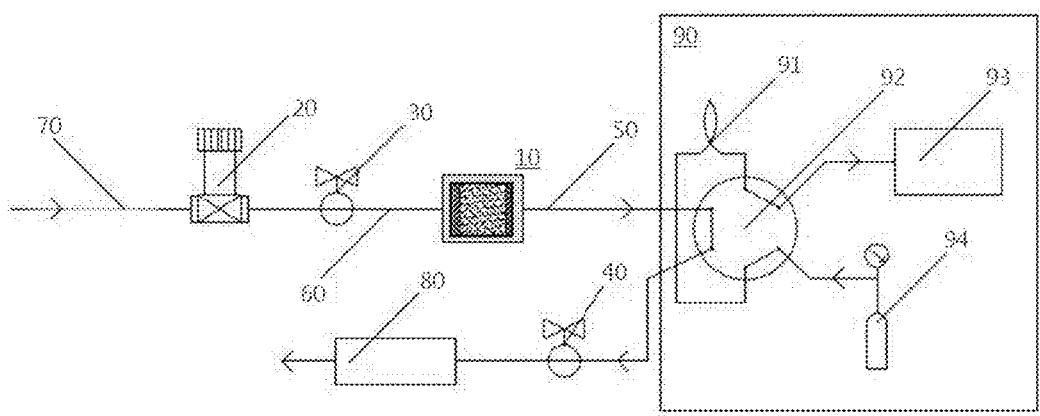
Figure 3:
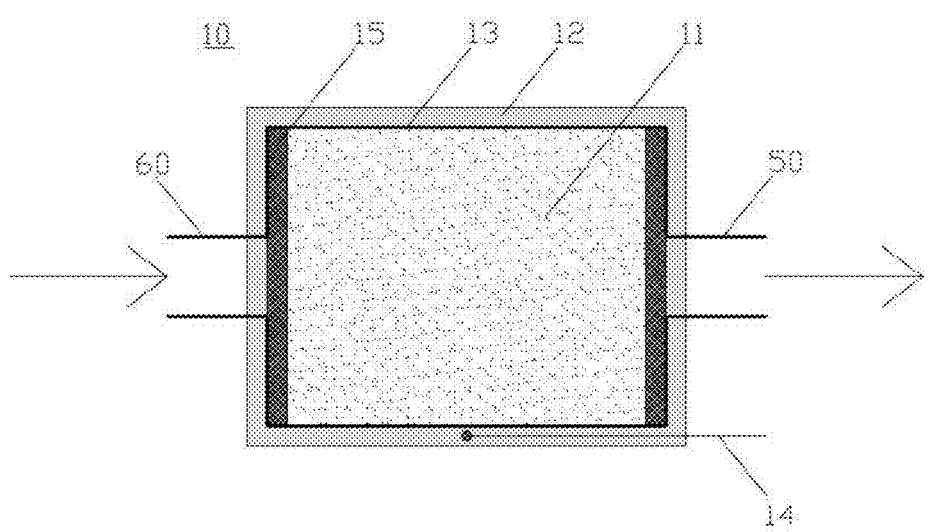
FIG. 3 schematically shows the adsorption/catalytic incineration reactor including a carbon nanotube-catalyst composite in Example 2 according to the present invention.

FIGS. 2A and 2B schematically show the device for removing organic compounds from air according to the embodiment of the present invention. FIG. 3 schematically shows an adsorption/catalytic incineration reactor to remove organic compounds from air according to the embodiment of the present invention.

The device for removing organic compounds from air according to the embodiment of the present invention comprises an air feeder 70, an air flow control valve 20 for controlling the flow rate of organic compounds in air, an adsorption/catalytic incineration reactor 10 for removing organic compounds from air, a suction pump 80 for sucking air, a gas analyzing system 90 and a dry gas supply source 94 that is supplied to the gas analyzing system 90, and includes a plurality of pipelines.

The air feeder 70 functions to feed VOCs in the air to the adsorption/catalytic incineration reactor 10 of the device for removing organic compounds from air, and the air flow control valve 20 is provided between the air feeder 70 and the adsorption/catalytic incineration reactor 10, and the air flow control valve 20 controls the flow of the fed air so that air is fed to the adsorption/catalytic incineration reactor 10.

The adsorption/catalytic incineration reactor 10 includes a heat-resistant glass tube 13, a carbon nanotube-catalyst composite 11, a heating unit 12, a temperature sensor 14, and fine porous materials 15.

The carbon nanotube-catalyst composite 11 which plays a role as an adsorption/catalytic incineration agent is charged in the glass tube 13, and the fine porous materials 15 are respectively disposed at both ends of the glass tube 13 to fix the carbon nanotube-catalyst composite 11. As such, respectively provided at both outer sides of the fine porous materials 15 are stainless steel meshes with small holes the size of which is suitable to preventing the carbon nanotube-catalyst composite 11 from passing through an air inlet and an air outlet. Further, glass wool may be additionally disposed at each of both outer sides thereof, to prevent the carbon nanotube-catalyst composite 11 from passing through the air inlet and the air outlet.

The heating unit 12 is mounted on the outer surface of the glass tube 13. This heating unit 12 is used to increase the temperature of the glass tube 13 in order to carry out the adsorption/catalytic incineration of VOCs fed to the carbon nanotube-catalyst composite 11 in the glass tube 13.

The heating unit 12 is made of nickel-chromium (Ni—Cr) wires to increase the temperature of the glass tube 13 to 250° C. at regular intervals or to make the temperature constant, and a temperature controller is used.

The temperature sensor 14 is mounted to rapidly sense the temperature when the temperature of the glass tube 13 is raised.

The carbon nanotube-catalyst composite 11 used as the adsorption/catalytic incineration agent of the organic compounds in air may include one disclosed in Example 1.

In the carbon nanotube-catalyst composite 11, catalyst particles having a size of ones of nm are uniformly dispersed to the carbon nanotubes, and the size of the catalyst particles bound to the carbon nanotubes is uniform, and the catalyst particles are in a spherical shape, and thus the carbon nanotube-catalyst composite 11 has a large surface area and may thus effectively carry out the adsorption/catalytic incineration treatment of the organic compounds present in air at low temperature, thus enabling the removal of VOCs.

As shown in FIGS. 2A and 2B, the pipeline conversion switching valve 92 includes six ports, pairs of twos of which are interconnected with each other by means of the inner pipelines.

With reference to FIG. 2A, organic compounds in air are fed from the air feeder to the adsorption/catalytic incineration reactor 10 which is connected to the suction pump 80. The fed organic compounds in air are subjected to adsorption/catalytic incineration while passing through the adsorption/catalytic incineration reactor 10. The pipeline conversion switching valve 92 converts the pipeline as shown in FIG. 2B so that it can be checked whether the adsorption/catalytic incineration reactor 10 has completely finished the adsorption and catalytic incineration of the fed organic compounds.

A gas analyzer 93 receives the dry gas from the dry gas supply source 94. As such the dry gas includes for example highly pure nitrogen, and in order to supply the dry gas, a pressure sensor, a flow rate controller, and a moisture controller, for example, a moisture trap, are provided.

Figure 4:
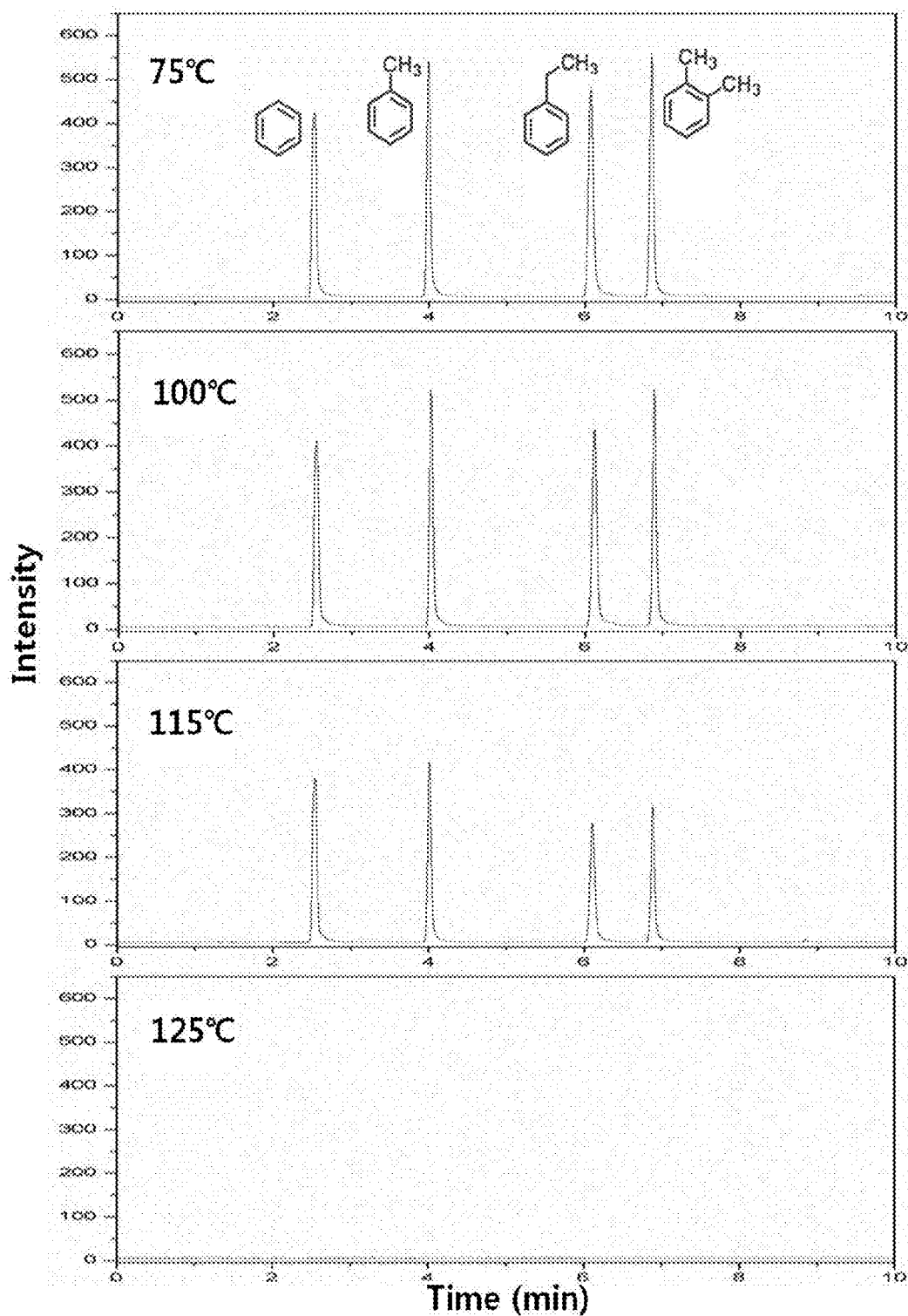
FIG. 4 shows the results of measuring the performance of the carbon nanotube-catalyst composite of the device for removing organic compounds from air of Example 2 to remove typical organic compounds via adsorption/catalytic incineration with respect to temperature.
Figure 5A:
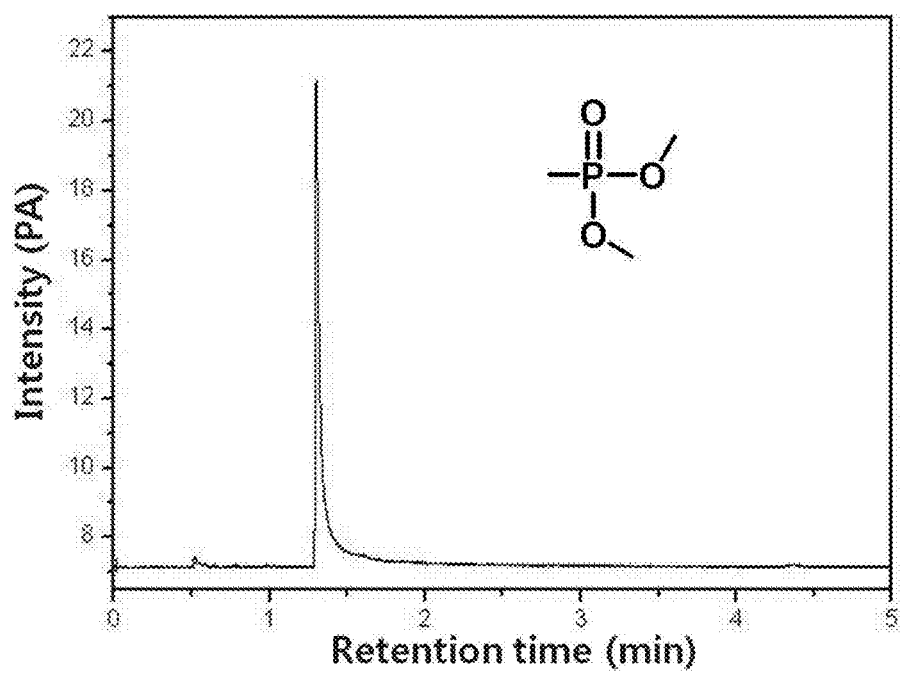
FIG. 5A shows a graph of measurements taken after the carbon nanotube-catalyst composite of the adsorption/catalytic incineration reactor in the device for removing organic compounds from air of Example 2 is completely saturated with dimethyl methyl phosphonate (DMMP) as a typical military analogous chemical.
Figure 5B:
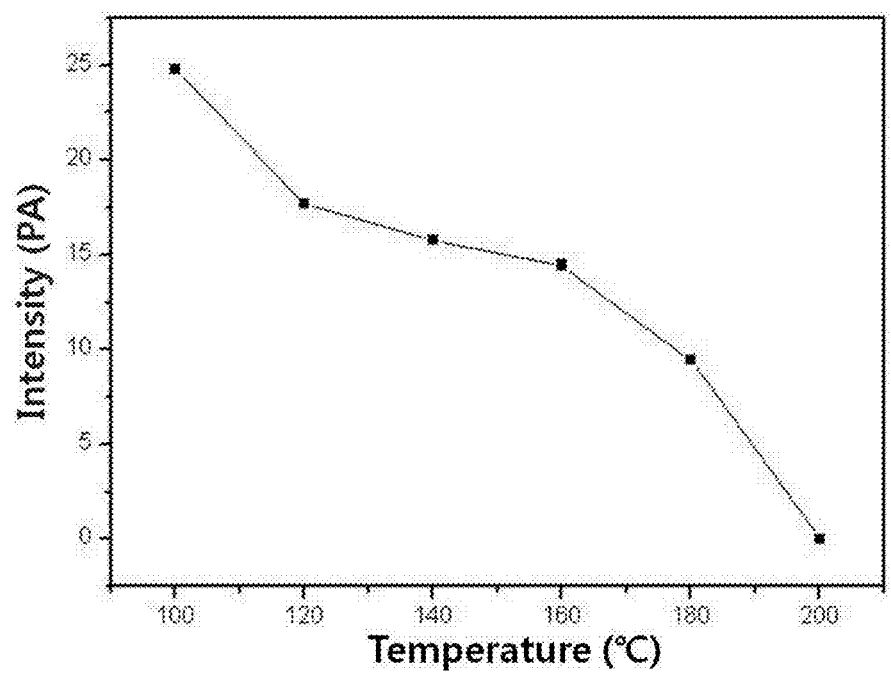
FIG. 5B shows the results of measuring the adsorption/catalytic incineration performance with respect to temperature.

FIGS. 4 and 5A and 5B show the performance of the carbon nanotube-catalyst composite 11 to remove representative VOCs and military chemicals via adsorption/catalytic incineration with respect to the temperature.

Example 1

A carbon nanotube-platinum composite of a device for removing organic compounds from air by adsorption/catalytic incineration of VOCs was prepared by the following procedures.

Into a 500 mL round-bottom four-neck flask reactor, multi-walled carbon nanotubes (Multi-wall CNT grade, available from Hanwha Nanotech) 0.3 g and ethylene glycol (available from Patech C&T) 280 mL were sequentially introduced. The flask reactor was equipped with a stirrer and the mixture was stirred for 30 min. The reactor was placed in a sonicator so that the carbon nanotubes were dispersed in ethylene glycol using ultrasound for 3 hours. As such, the temperature of the reactor should not exceed 50° C. After completion of the sonication, a stirrer was mounted again, and a thermometer and a cooling condenser were connected. While the reactor was stirred, polyvinylpyrrolidone (PVP, Sigma Aldrich, weight average molecular weight (Mw): 40,000) 1.68 g and oleylamine (available from Sigma Aldrich) 2.8 mL were added, and subsequently platinum acetylacetonate (available from Sigma Aldrich) 0.259 g was added. A vacuum pump was connected to the reactor so that the inner air of the reactor was removed and purged with nitrogen. While nitrogen was being continuously added, nitrogen was allowed to flow to the outside via the inside of the reactor, thus preventing the introduction of oxygen. A mantle was mounted under the flask and the stirrer was operated at 400 rpm for 30 min. The inner temperature of the reactor was raised to 200° C. over 40 min, and the reaction was allowed to take place for 1 hour. After termination of the reduction reaction, the temperature of the reactor was gradually decreased to room temperature over 3 hours. The synthesized carbon nanotube-platinum composite was washed and filtered using filter paper, washed three to five times with 1 L of each of ethyl acetate and hexane, and dried in an oven at 80r thus obtaining a carbon nanotube-platinum composite. As shown in a transmission electron microscope (TEM) image of FIG. 1 of the carbon nanotube-platinum composite thus obtained, the platinum particles were spherical and were uniformly dispersed and had a size of 5~6 nm.

Example 2

The performance of the device of FIG. 2A or 2B to remove organic compounds from air using adsorption/catalytic incineration was tested. As the adsorption/catalytic incineration agent of VOCs, carbon nanotube-platinum composite powder was used, and the adsorption/catalytic reaction was carried out in a continuous flow mode in the VOC adsorption/catalytic incineration reactor whose temperature was able to be controlled. The flow rate of VOCs was 20 mL/min, and the reaction temperature was set in the range from atmospheric temperature to 250° C. After reaction, the outlet gas was monitored using a flame ion detector (FID) of online gas chromatography (7890A, available from Agilent) to evaluate the VOC removal performance by adsorption/catalytic incineration at different reaction temperatures.

As such, 10 mg of a carbon nanotube-platinum composite (available from BIONEER) comprising platinum particles having a size of 5 nm was used, and typical VOCs were a mixture of benzene, toluene, ethylbenzene, and xylene and the military analogous chemical was DMMP, and the concentration was 100 ppm.

FIGS. 4 and 5A and 5B show the results of using the carbon nanotube-catalyst composite which functions not only to adsorb VOCs but also to decompose and remove them.

As shown in FIG. 4, the carbon nanotube-catalyst composite can be effective at completely decomposing VOCs at low reaction temperature.

Figure 6:
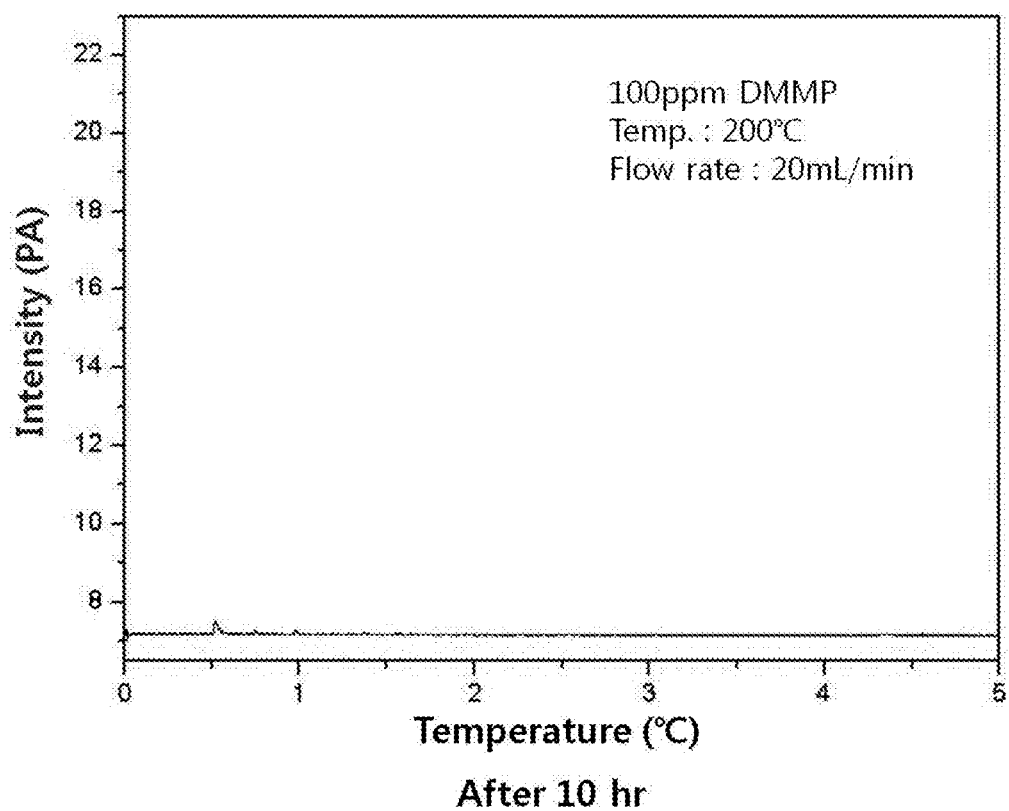
FIG. 6 shows the results after 10 hours while the flow rate of 100 ppm DMMP as a military analogous chemical is maintained at 20 mL/min in the device for removing organic compounds from air of Example 2.

As seen in FIGS. 5A and 5B and 6, the carbon nanotube-catalyst composite completely decomposed the military analogous chemical having low vapor pressure and high boiling point at a lower reaction temperature than typical methods. Under conditions of a constant temperature of 200° C. and an air flow rate of 20 mL/min at the time of feeding the sample, the sample adsorption/catalytic removal performance was maintained for 10 hours or longer.

As is apparent from the results of FIGS. 4 and 5A and 5B, the carbon nanotube-catalyst composite is useful for the adsorption of organic compounds present in air in the temperature range of 100° C. or less, and may exhibit a high ability to adsorb organic compounds from air because of its large surface area. The carbon nanotube-catalyst composite may be recycled by repeating cycles of adsorption, incineration, and regeneration in such a manner that adsorption is first carried out until before adsorption breakage takes place, and when the allowable concentration of organic compounds in air is detected by the gas analyzing system, the temperature of the adsorption/catalytic incineration reactor is raised thus completely decomposing and incinerating the organic compounds adsorbed thereto, followed by conducting regeneration, ultimately achieving efficient energy and a high degree of recycling.

Figure 7:
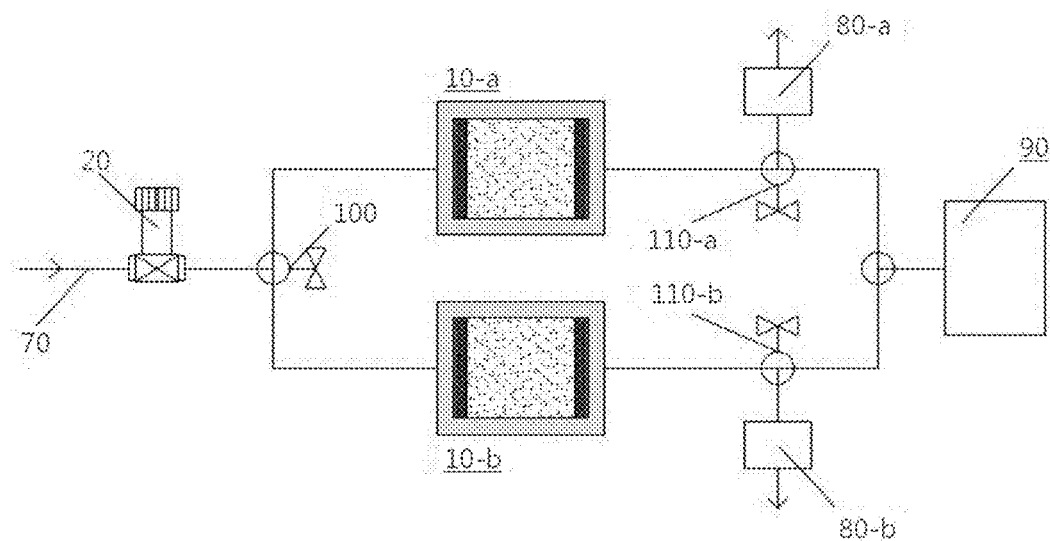
FIG. 7 shows a regenerable and energy-saving device for air purification and positive pressure preservation device, to which the device for removing organic compounds from air including the carbon nanotube-catalyst composite according to the present invention is applied.
Figure 8:
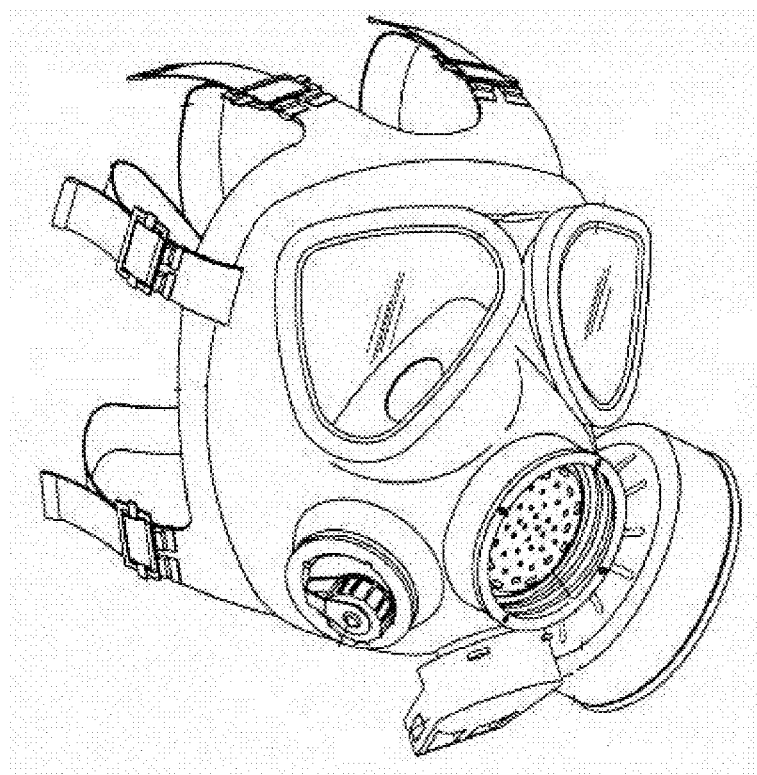
FIG. 8 shows a filter cartridge for a gas mask according to a conventional technique.

Currently, impregnated activated carbon has been applied to military poisonous gas removers, such as a gas mask, a protective cloth, a gas particle filter, a filter unit, etc., but such removers are heavy and are difficult to regenerate and are thus disposed after a single use, undesirably wasting a huge amount of money. Furthermore, because air permeability may decrease, it is difficult to wear them and perform certain work for a long period of time, and thermal fatigue may increase and thus fighting power may decrease. Such problems may be solved by efficiently applying the device for removing organic compounds from air according to the present invention to a removable filter for a gas mask and a system for air purification and positive pressure preservation device to remove poisonous gases for military purposes, as shown in FIGS. 7 and 8.

The invention claimed is:

1. A device for eliminating a harmful substance, comprising:
    an adsorption/catalytic incineration reactor including an inlet and an outlet, and filled with an adsorption/catalytic incineration agent including a carbon nanotube-catalyst composite of which a metal or metal oxide catalyst is bound to a surface of carbon nanotubes; and
    a heating unit for heating the adsorption/catalytic incineration reactor,
    wherein the heating unit is mounted on an outer surface of the adsorption/catalytic incineration reactor to increase temperature of the adsorption/catalytic incineration reactor.

2. The device of claim 1, wherein the carbon nanotubes are single-walled carbon nanotubes or multi-walled carbon nanotubes.

3. The device of claim 1, wherein the metal or metal oxide catalyst of the carbon nanotube-catalyst composite has a size of 1~20 nm, and an amount of the catalyst is 1~70 wt % based on a total weight of the carbon nanotube-catalyst composite.

4. The device of claim 3, wherein the catalyst includes one or two more elements selected from the group consisting of Ni, Cu, Al, Ti, Au, Ag, Pd, Pt, and mixtures thereof, or oxides thereof.

5. The device of claim 1, wherein the adsorption/catalytic incineration reactor includes a mixture of carbon nanotube-catalyst composite and activated carbon.

6. The device of claim 1, wherein a part or the entirety of the inlet and the outlet is provided with a fine porous material having a plurality of small holes.

7. The device of claim 6, wherein the fine porous material includes a pair of bundles of glass wool, or a pair of stainless steel meshes.

8. The device of claim 1, wherein the heating unit includes a nickel-chromium (Ni—Cr) wire or a carbonaceous planar heat-generating element enclosing the adsorption/catalytic incineration reactor.

9. The device of claim 1, further comprising an analyzing device for analyzing a concentration of the harmful substance in a fluid which is discharged from the outlet.

10. The device of claim 9, wherein the analyzing device includes a concentration analyzer, a dry gas supply source, and a pipeline conversion switching valve selectively connecting the outlet of the adsorption/catalytic incineration reactor to the concentration analyzer and the dry gas supply source.

11. The device of claim 1, further comprising a temperature sensor for measuring a temperature of the adsorption/catalytic incineration reactor and a temperature controller that receives a temperature from the temperature sensor to control the heating unit.

12. The device of claim 1, further comprising a suction pump for sucking the harmful substance in the heated adsorption/catalytic incineration reactor.

13. The device of claim 1, further comprising a flow rate control valve for controlling a flow rate of the harmful substance introduced into the inlet.

14. A method for eliminating a harmful substance using the device of claim 1.

15. The method of claim 14, comprising:
an adsorbing step of allowing the harmful substance to contact a carbon nanotube-catalyst composite of which a plurality of metals or metal oxide catalysts are uniformly bound to a surface of carbon nanotubes to adsorb the harmful substance on the carbon nanotube-catalyst composite; and
a catalyst incineration step of heating the carbon nanotube-catalyst composite to decompose the harmful substance adsorbed on the carbon nanotube-catalyst composite.

16. The method of claim 15, further comprising:
a step of measuring a concentration of the harmful substance discharged from the carbon nanotube-catalyst composite at a set time period after the adsorbing step; and
a step of switching the adsorbing step into the catalyst incineration step in the case in which the measured concentration of the harmful substance is a set value or more.

17. The method of claim 15, wherein the adsorbing step is performed at a room temperature.

18. The method of claim 15, wherein the catalyst incineration step is performed at temperature of 100 to 250° C.

19. A portable gas mask using the device of claim 1 as a detachable poison eliminating filter.

20. An air purification or positive pressure preservation device for closed type device, which comprises two devices for eliminating a harmful substance of claim 1 and two 3-way valves having a first 3-way valve and a second 3-way valve so that adsorption and catalytic incineration are sequentially continuously performed at a regular interval, wherein a common port of the first 3-way valve is connected to an air suction pipe, and selective ports of the first 3-way valve are respectively connected to air inlets of adsorption/catalytic incineration reactors of the two devices for removing organic compounds from air, and selective ports of the second 3-way valve are respectively connected to air outlets of the adsorption/catalytic incineration reactors thereof, and a common port of the second 3-way valve is connected to a gas analyzing system and an outlet, and thus, while the saturated adsorption/catalytic incineration reactor that performed adsorption is regenerated by heating and catalytic incineration, the other adsorption/catalytic incineration reactor is connected to an air flow line.

21. The air purification or positive pressure preservation device of claim 20, wherein the common port of the second 3-way valve is additionally connected between the gas analyzing system and the outlet, so that when an allowable concentration of the organic compounds in air discharged from the adsorption/catalytic incineration reactor is detected by means of the gas analyzing system, the adsorption/catalytic incineration reactor is switched.

* * * * *